(12) United States Patent
Bhagavathiperumal et al.

(10) Patent No.: US 10,355,873 B2
(45) Date of Patent: *Jul. 16, 2019

(54) FAST RECOVERY OF MULTICAST ROUTER PORTS ON SPANNING TREE PROTOCOL (STP) TOPOLOGY CHANGE IN A LAYER 2 (L2) NETWORK

(71) Applicant: International Business Machines Corporation, Armonk, NY (US)

(72) Inventors: Chidambaram Bhagavathiperumal, San Jose, CA (US); Angu Selvam Chandra Sekaran, Santa Clara, CA (US); Suryanarayan Ramamurthy, Sunnyvale, CA (US); Jun Yao, Qing Xi Town (CN); Yuan Yuan Zhang, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 15/402,102

(22) Filed: Jan. 9, 2017

(65) Prior Publication Data

US 2017/0118035 A1 Apr. 27, 2017

Related U.S. Application Data

(63) Continuation of application No. 14/598,159, filed on Jan. 15, 2015, now Pat. No. 9,602,396.

(51) Int. Cl.
*H04L 12/18* (2006.01)
*H04L 12/703* (2013.01)
(Continued)

(52) U.S. Cl.
CPC ........ *H04L 12/1868* (2013.01); *H04L 12/185* (2013.01); *H04L 12/1863* (2013.01);
(Continued)

(58) Field of Classification Search
None
See application file for complete search history.

(56) References Cited

U.S. PATENT DOCUMENTS 8,654,769 B2   2/2014   Mentze et al.
9,602,396 B2 *  3/2017   Bhagavathiperumal ..................
                                                          H04L 45/16
(Continued)

OTHER PUBLICATIONS

List of IBM Patents or Patent Applications Treated as Related.
(Continued)

*Primary Examiner* — Anh Ngoc M Nguyen
(74) *Attorney, Agent, or Firm* — Zilka-Kotab, P.C.

(57) ABSTRACT

In one embodiment, an apparatus includes a processing circuit and logic integrated with and/or executable by the processing circuit. The logic is configured to cause the processing circuit to handle Internet Group Membership Protocol (IGMP) messages received from other devices in a network. Also, the logic is configured to cause the processing circuit to create a general query solicit (GQS) message configured to solicit a general query (GQ) from a multicast snooping querier coupled with the apparatus. In another embodiment, a method includes handling, using a switch in a network, IGMP messages received from other devices in the network, and creating, using the switch, a GQS message configured to solicit a GQ from a multicast snooping querier coupled with the switch. Other systems, methods, and computer program products are described in more embodiments.

16 Claims, 7 Drawing Sheets

(51) Int. Cl.
*H04L 12/751* (2013.01)
*H04L 12/761* (2013.01)
*H04L 12/24* (2006.01)
*H04L 12/26* (2006.01)
*H04L 12/753* (2013.01)
*H04L 12/931* (2013.01)

(52) U.S. Cl.
CPC ...... *H04L 41/0672* (2013.01); *H04L 41/0816* (2013.01); *H04L 43/0811* (2013.01); *H04L 45/02* (2013.01); *H04L 45/16* (2013.01); *H04L 45/28* (2013.01); *H04L 45/48* (2013.01); *H04L 49/65* (2013.01)

(56) References Cited

U.S. PATENT DOCUMENTS

| | | | | |
|---|---|---|---|---|
| 2002/0085557 | A1* | 7/2002 | Jensen | H04L 12/185 370/390 |
| 2002/0196802 | A1 | 12/2002 | Sakov et al. | |
| 2008/0186898 | A1* | 8/2008 | Petite | H04W 40/00 370/315 |
| 2009/0213855 | A1 | 8/2009 | Xu | |
| 2010/0316057 | A1* | 12/2010 | Shiraki | H04L 45/18 370/401 |
| 2013/0136122 | A1 | 5/2013 | Keesara et al. | |
| 2013/0182707 | A1 | 7/2013 | Angst et al. | |
| 2013/0258855 | A1 | 10/2013 | Bos et al. | |
| 2015/0103675 | A1* | 4/2015 | Mentze | H04L 43/0805 370/248 |
| 2016/0212040 | A1 | 7/2016 | Bhagavathiperumal et al. | |

OTHER PUBLICATIONS

Bhagavathiperumal, U.S. Appl. No. 14/598,159, dated Jan. 15, 2015.

Non-Final Office Action from U.S. Appl. No. 14/598,159, dated Jul. 11, 2016.

Cohen et al., "Migration to Ethernet-Based DSL Aggregation," Technical Report DSL Forum TR-101, Architecture and Transport Working Group, Apr. 2006, pp. 1-101.

Notice of Allowance from U.S. Appl. No. 14/598,159, dated Nov. 9, 2016.

Bhagavathiperumal, U.S. Appl. No. 16/384,623, filed Apr. 15, 2019.

* cited by examiner

FAST RECOVERY OF MULTICAST ROUTER PORTS ON SPANNING TREE PROTOCOL (STP) TOPOLOGY CHANGE IN A LAYER 2 (L2) NETWORK

BACKGROUND

The present invention relates to managing multicast router ports in a Layer 2 (L2) network, and more particularly, this invention relates to fast recovery of multicast router ports on spanning tree protocol (STP) topology change in a L2 network.

In a L2 network, for multicast traffic with Internet Group Management Protocol (IGMP) version 3, according to Internet Engineering Task Force (IETF) Request For Comment (RFC) 3376, there is no existing method or mechanism in place or described to recover multicast router ports in an expedited manner. As a result, upon a STP topology change, multicast traffic may take multiple minutes to recover. This loss of multicast traffic for such a prolonged time period may result in significant information loss in the L2 network.

Several known solutions to recover multicast traffic quickly in an IGMP snooping network include the following procedures: a) flooding multicast traffic for a few minutes (or longer) after a STP topology change; b) sending IGMP general queries with source=0.0.0.0; and c) lowering the IGMP query interval to 15 seconds. However, each of the above known solutions have drawbacks, specifically that solution a) unnecessarily floods traffic on the network, and specifically on a virtual local area network (VLAN) specified by the multicast traffic, solution b) does not completely solve the problem and leaves another problem to be solved, and solution c) is not scalable, and therefore is ineffective in large scale and/or distributed network systems.

SUMMARY

In one embodiment, an apparatus includes a processing circuit and logic integrated with and/or executable by the processing circuit. The logic is configured to cause the processing circuit to handle Internet Group Membership Protocol (IGMP) messages received from other devices in a network. Also, the logic is configured to cause the processing circuit to create a general query solicit (GQS) message configured to solicit a general query (GQ) from a multicast snooping querier coupled with the apparatus.

In another embodiment, a method includes handling, using a switch in a network, IGMP messages received from other devices in the network, and creating, using the switch, a GQS message configured to solicit a GQ from a multicast snooping querier coupled with the switch.

In yet another embodiment, a computer program product includes a computer readable storage medium having program instructions embodied therewith. The program instructions are executable by a processor of a switch to cause the processor to handle, by the processor, Internet Group Membership Protocol (IGMP) messages received from other devices in a network. Also, the program instructions are executable to cause the processor to create, by the processor, a GQS message configured to solicit a GQ from a multicast snooping querier coupled with the switch.

Other aspects and embodiments of the present invention will become apparent from the following detailed description, which, when taken in conjunction with the drawings, illustrate by way of example the principles of the invention.

DETAILED DESCRIPTION

Figure 1:
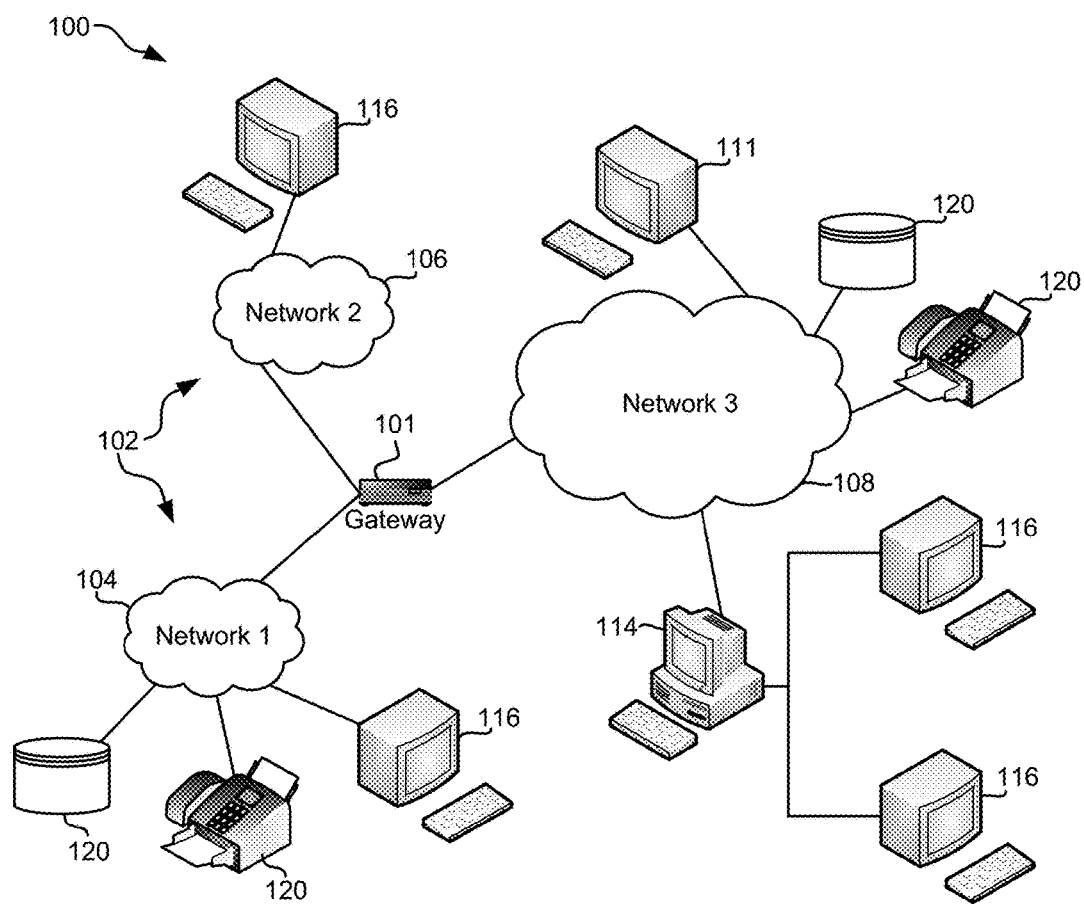
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

Described herein in various embodiments is a mechanism to enable fast recovery of multicast router ports, and hence, fast recovery of multicast traffic upon a spanning tree protocol (STP) topology change in a Layer 2 (L2) network.

In one general embodiment, a system includes a multicast snooping querier configured to send and receive Internet Group Membership Protocol (IGMP) messages, and one or more IGMP switches interconnected to form a network, wherein at least one of the one or more IGMP switches is connected to the multicast snooping querier, wherein the one or more IGMP switches are configured to: handle IGMP messages, and create a general query solicit (GQS) message configured to solicit a general query from the multicast snooping querier, and wherein the multicast snooping querier is configured to send out a general query (GQ) message on all ports in response to receiving the GQS message to solicit port information and group membership information from each of the one or more IGMP switches.

In another general embodiment, a method includes creating a GQS message using an IGMP switch interconnected with one or more other IGMP switches to form a network, wherein the GQS message is configured to solicit a general query from a multicast snooping querier, receiving the GQS message using the multicast snooping querier, and sending out a GQ message on all ports of the multicast snooping querier in response to receiving the GQS message to solicit port information and group membership information from all IGMP switches.

In yet another general embodiment, a computer program product includes a computer readable storage medium having program instructions embodied therewith, the program instructions being executable by a processor in a switch configured to handle IGMP messages to cause the processor to: determine, by the processor, that a link connected between an IGMP switch and another IGMP switch has failed, create, by the processor, a GQS message configured to solicit a GQ from a multicast snooping querier, the GQ being configured to solicit port information and group membership information from all IGMP switches, and send, by the processor, the GQS message out on all forwarding ports except for a port of the IGMP switch connected to the failed link in order to reach the multicast snooping querier.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
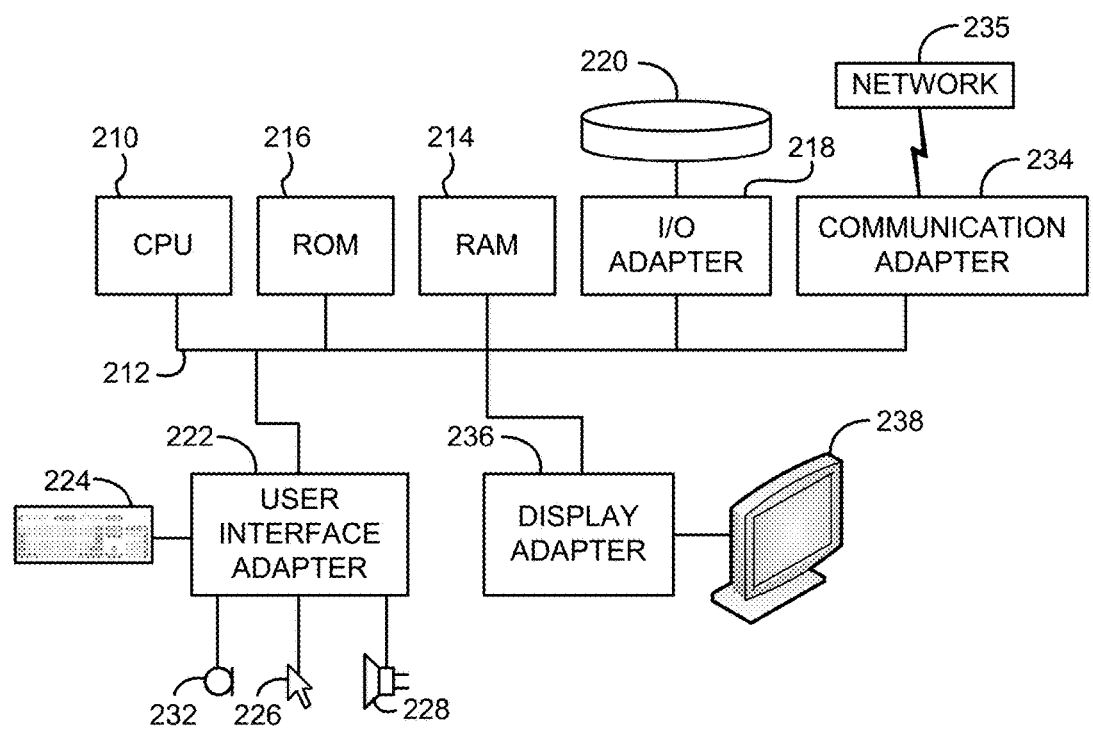
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Currently, methods of achieving interconnectivity between a large number of L2 ports rely on having numerous discrete switches each running STP or transparent interconnect of lots of links (TRILL). In order to quickly recover multicast traffic after a topology change in an IGMP snooping L2 network, a new IGMP message type called a General Query Solicit (GQS) message is defined. Upon a topology change, the new GQS message is flooded by IGMP snooping switches on all forwarding ports. The multicast IGMP router (and/or snooping querier), upon receiving the GQS message, sends a general query (GQ) message on a virtual local area network (VLAN). The GQ message is a broadcast packet on the LAN to solicit reports to include group membership information and port information, so that the multicast traffic routing tree may be rebuilt and/or re-established by the IGMP router and/or multicast router. The GQ message enables all IGMP snooping switches to relearn local multicast router ports of each IGMP snooping switch.

FIGS. 3A-3D are simplified diagrams of a network system 300 illustrating a STP topology change management, such as a link failure, according to one embodiment. Now referring to FIG. 3A, a simplified network system 300 is shown according to one embodiment. The network system 300 includes at least one IGMP router 302 connected to one or more IGMP switches 304. Any of the IGMP switches 304 may also be connected to other IGMP switches 306 which are not directly connected to the IGMP router 302, in some approaches. Any suitable connection may be used to connect the various devices, such as Ethernet connections, etc.

The network system 300 may be a LAN, a WAN, or some other suitable network type known in the art, and may support one or more VLANs. Each IGMP switch 304, 306 may be individually selected to either be included in a particular VLAN or excluded from the particular VLAN in the context of processing packets destined for and/or received from the particular VLAN.

In one embodiment, the IGMP router 302 may be a snooping querier of a type known in the art, in addition to or instead of being an IGMP router, which does not change the various functionality and methodology described herein in various embodiments. Furthermore, in the examples provided herein, the IGMP router 302 is also assumed to be a multicast router, which is configured to forward multicast packets to all devices in the network 300.

When a device other than the IGMP router 302 acts as the multicast router, in one embodiment, the IGMP router 302 is configured to forward information to the multicast router to enable the multicast router to relearn the group membership information and port information for each IGMP switch 304, 306 in the network 300.

In more embodiments, each of the IGMP switches 304, 306 may be snooping switches or in some other way capable of understanding IGMP commands, such as general query messages, group-specific query messages, leave group messages, etc.

Figure 3A:
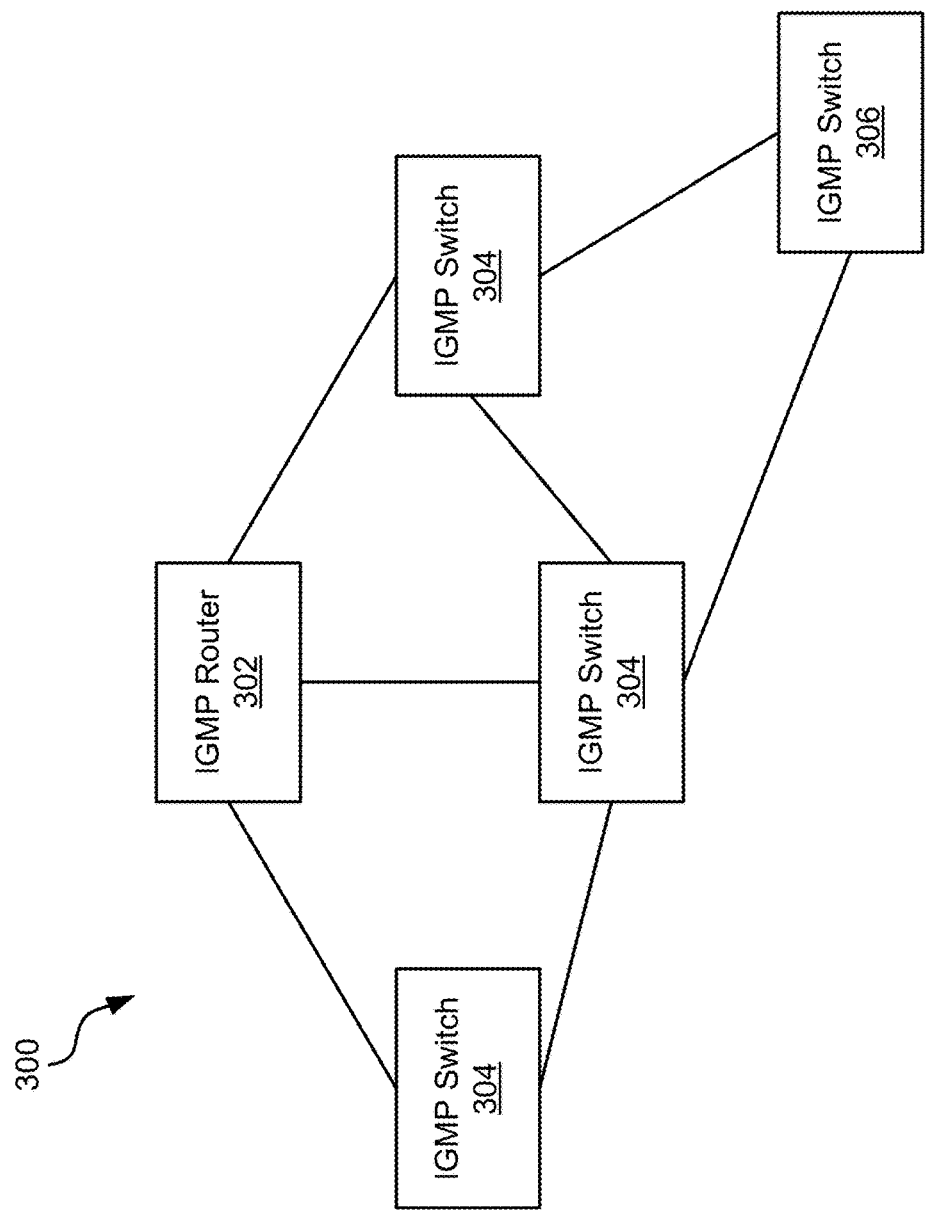
FIGS. 3A-3D are simplified diagrams of a network system illustrating topology change management, according to one embodiment.
Figure 3B:
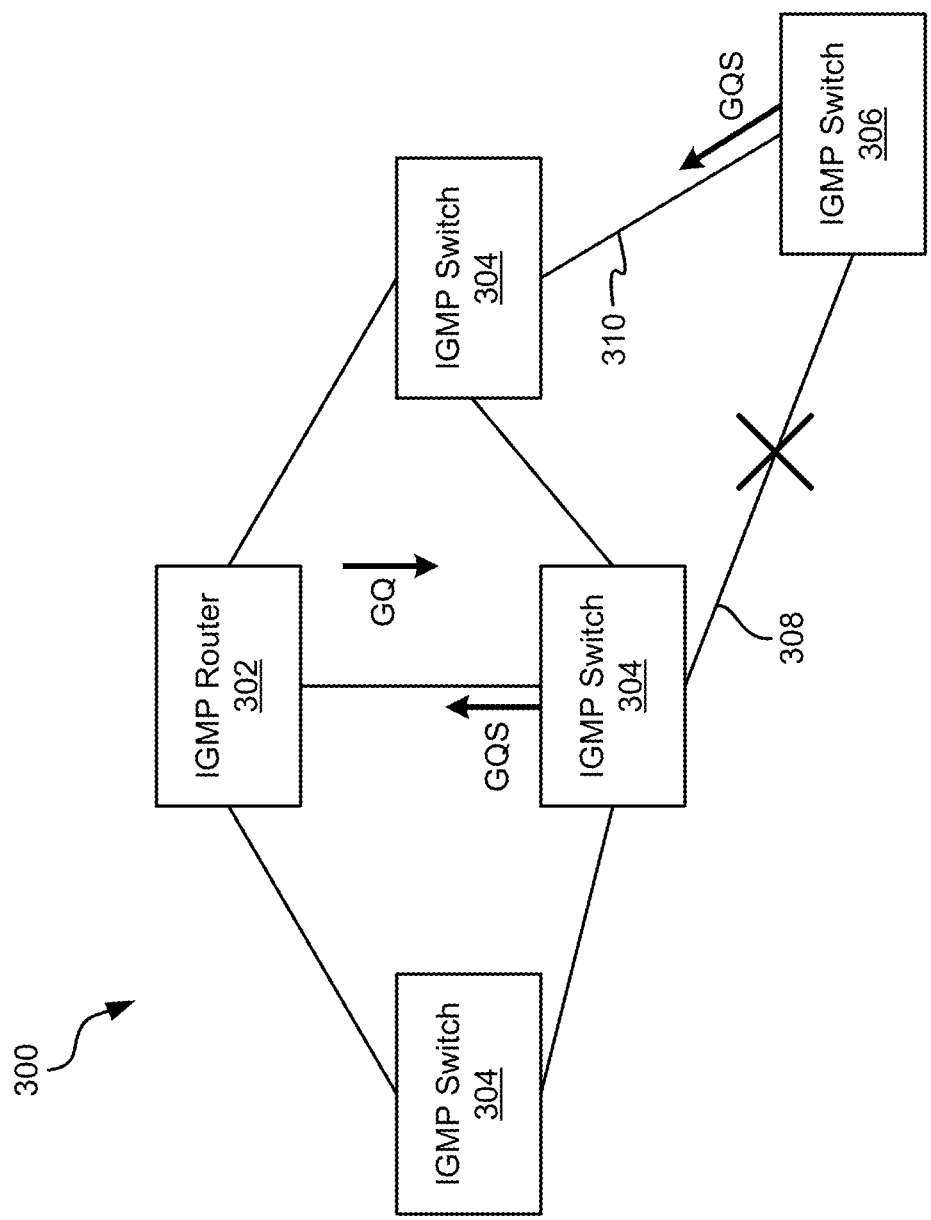

Now referring to FIG. 3B, when a connection or link 308 is disrupted, severed, faulty, or in some other way loses functionality, a STP topology change occurs because the link 308 is no longer capable of having traffic sent thereacross. Therefore, one or more alternate links must be determined to be used to deliver traffic to/from IGMP switch 306, in this case, link 310.

In order to notify the IGMP router 302 of the topology change, at least one GQS message is created by one or more of the IGMP switches which are aware of the link 308 failure. The GQS message is sent on all active ports when a topology change occurs.

As shown in FIG. 3B, one of the IGMP switches 304 and IGMP switch 306 both create a GQS message and forward it to the IGMP router 302; however, only one GQS message is necessary to notify the IGMP router 302 of the link 308 failure.

When there is no active snooping querier on the IGMP switch 304 when the IGMP switch 304 receives the GQS message, the IGMP switch 304 is configured to forward the GQS message on all other forwarding ports, thereby flooding the network 300 with the GQS message, which will ultimately reach the IGMP router 302.

When there is an active snooping querier on a IGMP switch 304 when the IGMP switch 304 receives the GQS message, the IGMP switch 304 is configured to reply to the GQS message with a GQ. This same functionality is in place for a multicast router.

In one embodiment, the GQS message may include all formatting and fields of a standard general query message under IGMP, except that the type number is changed from 0x11 (used for general queries) to 0xF1, or some other agreed upon value which is recognizable by the IGMP router 302 as indicating a GQS message. For example, the GQS message may have the following format:

| Type | Max Response Time Group Address | Checksum |
|---|---|---|

The maximum response time field, checksum field, and group address fields may be utilized according to the standards presented in IGMP RFC 2236, or may be changed in some way to further customize the exchange of information between the IGMP router 302 and the network devices.

Because the GQS is a new type for membership query messages in IGMP, when the GQS is received by any hosts, devices, and/or switches in the network 300 that do not support IGMP or snooping, the GQS message will be dropped as an unknown message type and will not affect the existing IGMP behavior for any hosts, devices, and/or switch(es) in the network 300 which do not support IGMP or snooping.

Figure 3C:
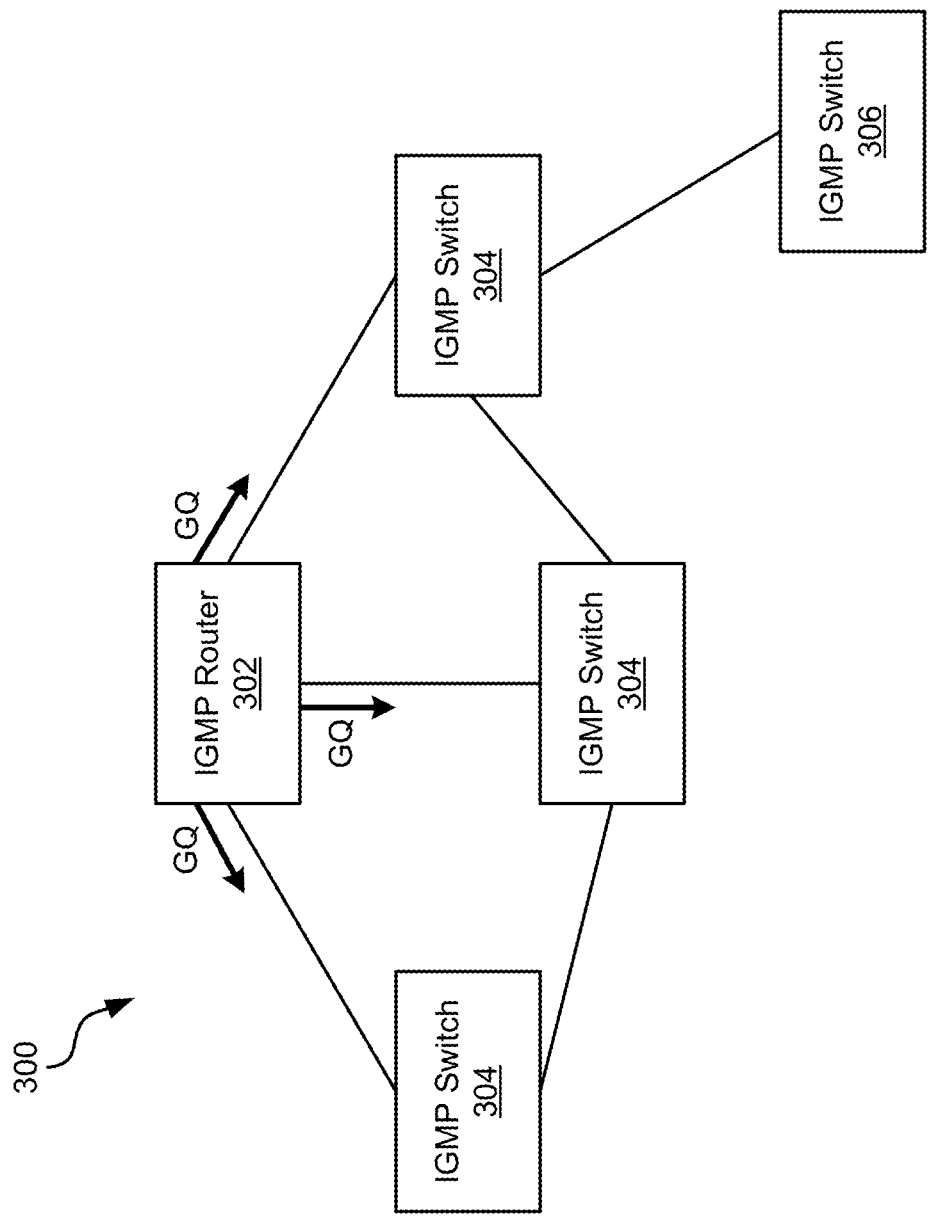

Now referring to FIG. 3C, upon reception of the GQS, the IGMP router 302 sends out a general query (GQ) message on all ports to notify devices of the switch topology change. In some embodiments, the GQ message may not be sent out to the notifying device(s) which created the GQS message(s), or it may be sent out to all devices (flooded) regardless of reception of a GQS message.

Furthermore, the GQS message is flooded to the entire network 300 since the forwarding rule for the GQS message is similar to the forwarding rule for a GQ message.

Figure 3D:
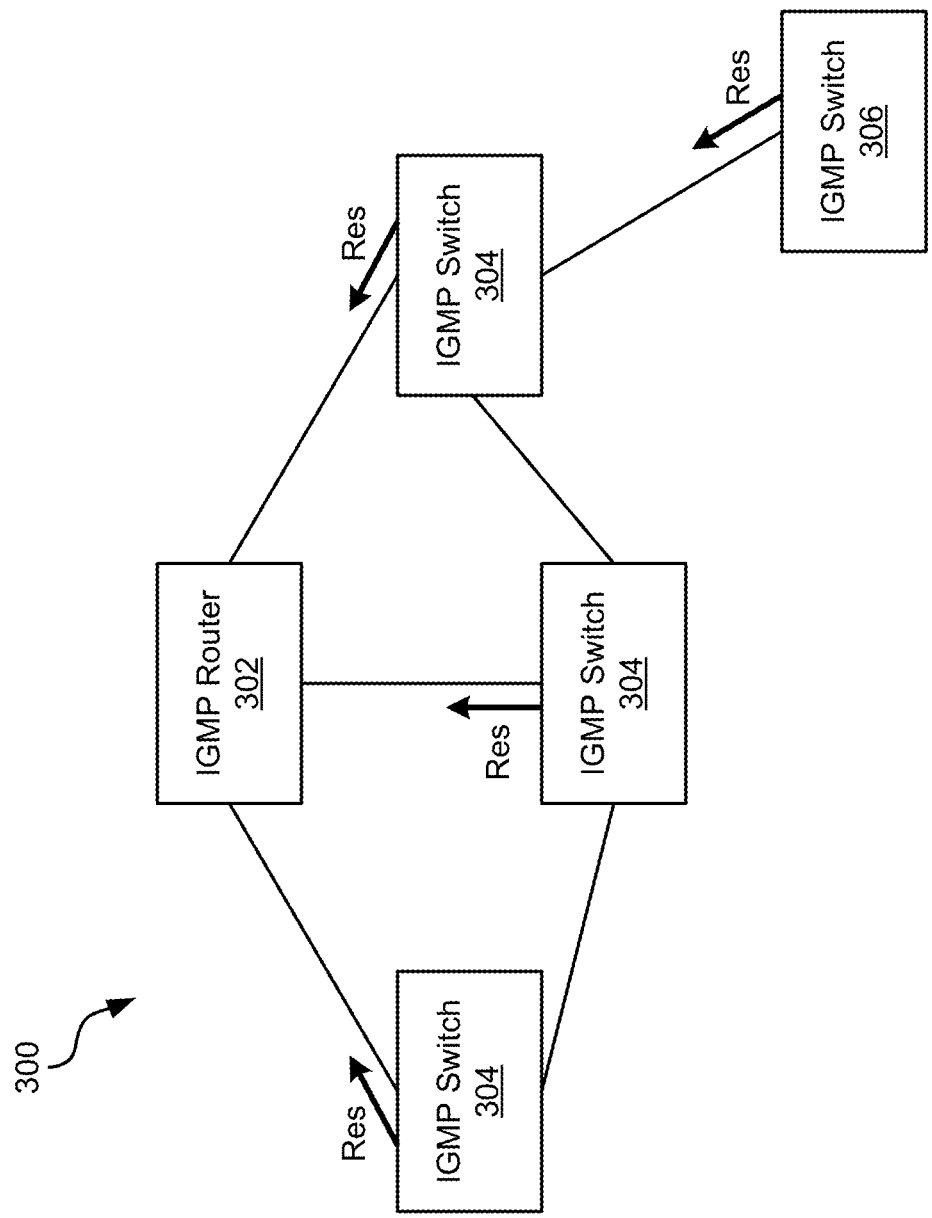

As shown in FIG. 3D, all the IGMP switches 304, 306 in the network 300 send a response (Res) to the GQ message indicating group membership information and port information, so that multicast traffic routing information may be re-established.

Then, the IGMP router 302 re-establishes and/or rebuilds a multicast traffic routing tree according to the network 300 topology after the STP topology change, such as in a forwarding information base (FIB), routing information base (RIB), etc. The ability to properly forward multicast traffic is recovered quickly when the response messages are sent in response to the GQ, and the IGMP router ports are re-learnt properly to provide full multicast routing through the network 300.

Figure 4:
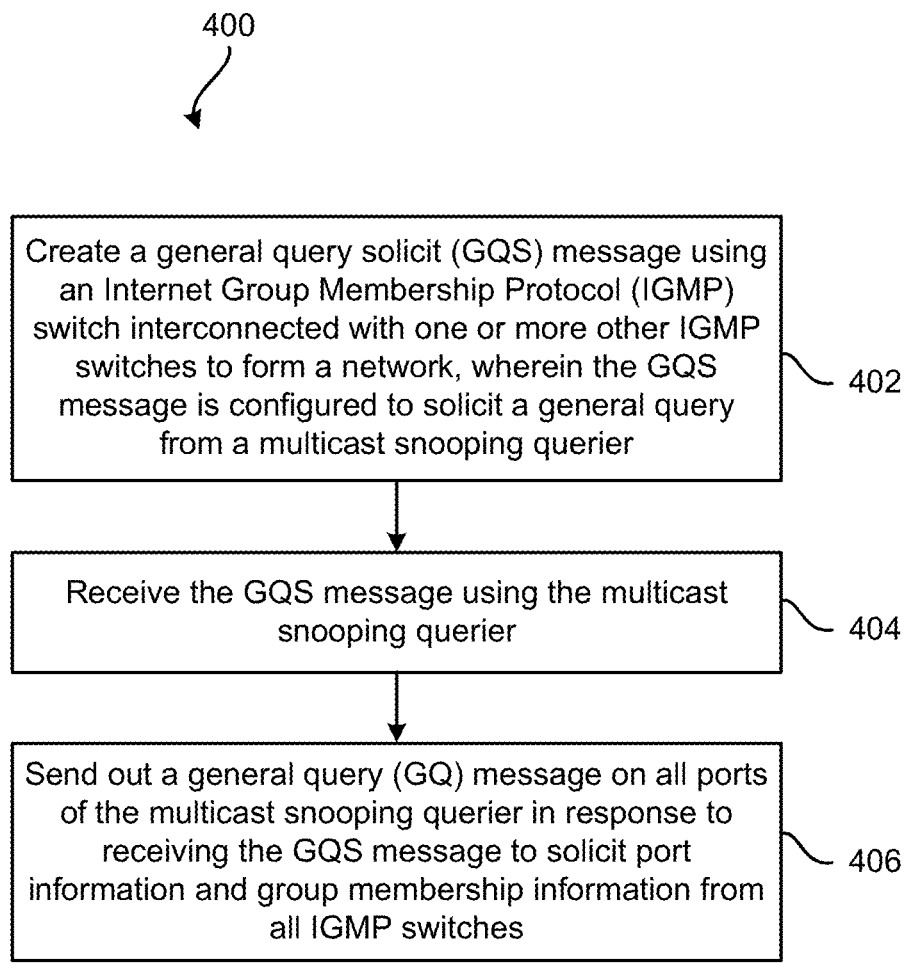
FIG. 4 is a flowchart of a method, according to one embodiment.

Now referring to FIG. 4, a flowchart of a method 400 for recovering multicast traffic routing is shown, according to one embodiment. The method 400 may be performed in accordance with the present invention in any of the environments depicted in FIGS. 1-3D, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in one embodiment, the method 400 may be partially or entirely performed by a processor, components in a network, a IGMP router, a IGMP switch, a multicast router, etc.

As shown in FIG. 4, method 400 may initiate with operation 402, where a GQS message is created using an IGMP switch interconnected with one or more other IGMP switches to form a network. The GQS message is configured to solicit a general query from a multicast snooping querier, as explained in more detail previously.

In operation 404, the GQS message is received by the multicast snooping querier. The GQS message may be sent via any suitable connections between the IGMP switch and the multicast snooping querier, and may be forwarded on by any of the other IGMP switches when the originating IGMP switch is not directly connected to the IGMP snooping querier.

In one embodiment, at least one of the IGMP switches may be directly connected to the multicast snooping querier, and this IGMP switch is the one which ultimately forwards the GQS message to the multicast snooping querier.

In more embodiments, the multicast snooping querier may be a multicast router, an IGMP router, an IGMP switch, or some other device capable of understanding IGMP messages, and configured to forward such messages to their intended recipients.

In operation 406, a GQ message is set out on all ports of the multicast snooping querier in response to receiving the GQS message. The GQ message is configured to solicit port information and group membership information from all IGMP switches in the network.

Specifically, when a switch is configured as a snooping proxy, then the GQ message will solicit port and group membership information from the switch. Otherwise, when a switch is not enabled for snooping proxy, the GQ message will solicit port and group membership information from any multicast traffic receiving devices.

Furthermore, in one approach, method 400 may include determining, using the IGMP switch, that a link connected to another IGMP switch has failed prior to creating the GQS message. Furthermore, method 400 may include sending, using the IGMP switch, the GQS message out on all forwarding ports except for a port connected to the failed link. In this way, the GQS message will be sent to and received by the multicast snooping querier.

In another further embodiment, method 400 may include setting, using the IGMP switch, a type field in the GQS message to 0xF1 prior to sending the GQS message to the IGMP snooping querier. Of course, any other agreed upon value may be used in place of 0xF1 as long as it is not already used to denote a message type and all IGMP devices in the network understand what the value indicates, e.g., a GQS message to solicit a GQ from the IGMP snooping querier.

In an even further embodiment, method 400 may include responding, using the IGMP switch, to the GQ message with a response that includes port information and group membership information to enable the multicast snooping querier to build a multicast routing tree. The port information may include all ports on the IGMP switch and which ports have links configured thereon that are operational. The group membership information may include which ports are connected to devices which are part of one or more IGMP groups.

In another embodiment, method 400 may include receiving, using the IGMP snooping querier, one or more responses from the IGMP switches. these responses may be sent in response to the IGMP switches receiving the GQ from the IGMP snooping querier. In addition, a multicast routing tree may be built and/or re-established, using the IGMP snooping querier, with port information and group membership information from the one or more responses. In this way, the IGMP snooping querier is able to enable multicast routing on the network quickly after a STP topology change.

After building and/or establishing the multicast routing tree, the multicast routing tree may be utilized to send out a multicast message using the IGMP snooping querier.

The method may be executed in a system, on a computer program product, in one or more components or devices of a network, etc. In one such embodiment, a system includes a multicast snooping querier configured to send and receive IGMP messages and one or more IGMP switches interconnected to form a network. At least one of the one or more IGMP switches is connected to the multicast snooping querier, and the one or more IGMP switches are configured to: handle IGMP messages and create a GQS message configured to solicit a general query from the multicast snooping querier. Also, the multicast snooping querier is configured to send out a general query (GQ) message on all ports in response to receiving the GQS message to solicit port information and group membership information from each of the one or more IGMP switches.

In another such embodiment, a computer program product includes a computer readable storage medium having program instructions embodied therewith, the program instructions being executable by a processor in a switch configured to handle IGMP messages to cause the processor to: determine, by the processor, that a link connected between an IGMP switch and another IGMP switch has failed; create, by the processor, a GQS message configured to solicit a GQ from a multicast snooping querier, the GQ being configured to solicit port information and group membership information from all IGMP switches; and send, by the processor, the GQS message out on all forwarding ports except for a port of the IGMP switch connected to the failed link in order to reach the multicast snooping querier.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a processing circuit;
logic integrated with and/or executable by the processing circuit, the logic being configured to cause the processing circuit to:
   handle Internet Group Membership Protocol (IGMP) messages received from other devices in a network;
   create a general query solicit (GQS) message configured to solicit a general query (GQ) from a multicast snooping querier coupled with the apparatus;
   determine that a link coupled to another IGMP switch in the network has failed prior to creating the GQS message; and
   send the GQS message out on all forwarding ports except for a port coupled to the failed link.

2. The apparatus as recited in claim 1, wherein the multicast snooping querier is a multicast router, an IGMP router, or an IGMP switch.

3. The apparatus as recited in claim 1, wherein the GQS message causes the multicast snooping querier to send out a general query (GQ) message on all ports in response to receiving the GQS message.

4. The apparatus as recited in claim 3, wherein the GQ message is configured to solicit port information and group membership information from each IGMP switch in the network.

5. The apparatus as recited in claim 1, wherein the logic further causes the processing circuit to respond to:
receive a second GQ message; and
respond to the second GQ message with a response that includes port information and group membership information to enable the multicast snooping querier to build a multicast routing tree.

6. The apparatus as recited in claim 1, wherein the GQS message has a type field set to 0xF1.

7. A method, comprising:
- handling, using a switch in a network, Internet Group Membership Protocol (IGMP) messages received from other devices in the network;
- creating, using the switch, a general query solicit (GQS) message configured to solicit a general query (GQ) from a multicast snooping querier coupled with the switch,
- determining that a link coupled to another IGMP switch in the network has failed prior to creating the GQS message; and
- sending the GQS message out on all forwarding ports except for a port coupled to the failed link.

8. The method as recited in claim 7, wherein the multicast snooping querier is a multicast router, an IGMP router, or an IGMP switch.

9. The method as recited in claim 7, wherein the GQS message causes the multicast snooping querier to send out a general query (GQ) message on all ports in response to receiving the GQS message, the GQ message being configured to solicit port information and group membership information from each IGMP switch in the network.

10. The method as recited in claim 7, further comprising:
- receiving a second GQ message; and
- responding to the second GQ message with a response that includes port information and group membership information to enable the multicast snooping querier to build a multicast routing tree.

11. The method as recited in claim 7, wherein the GQS message has a type field set to 0xF1.

12. A computer program product, comprising a computer readable storage medium having program instructions embodied therewith, the program instructions being executable by a processor of a switch to cause the processor to:
- handle, by the processor, Internet Group Membership Protocol (IGMP) messages received from other devices in a network; and
- create, by the processor, a general query solicit (GQS) message configured to solicit a general query (GQ) from a multicast snooping querier coupled with the switch,
- wherein the GQS message causes the multicast snooping querier to send out a general query (GQ) message on all ports in response to receiving the GQS message,
- wherein the GQ message is configured to solicit port information and group membership information from each IGMP switch in the network.

13. The computer program product as recited in claim 12, wherein the multicast snooping querier is a multicast router, an IGMP router, or an IGMP switch.

14. The computer program product as recited in claim 12, wherein the program instructions are further executable to cause the processor to:
- determine, by the processor, that a link coupled to another IGMP switch in the network has failed prior to creating the GQS message; and
- send, by the processor, the GQS message out on all forwarding ports except for a port coupled to the failed link.

15. The computer program product as recited in claim 12, wherein the program instructions are further executable to cause the processor to:
- receive, by the processor, a second GQ message; and
- respond, by the processor, to the second GQ message with a response that includes port information and group membership information to enable the multicast snooping querier to build a multicast routing tree.

16. The computer program product as recited in claim 12, wherein the GQS message has a type field set to 0xF1.

* * * * *